(12) United States Patent
Kulinsky (10) Patent No.: US 11,001,002 B2
(45) Date of Patent: May 11, 2021

(54) POWDER BED ADDITIVE MANUFACTURING METHOD OF FABRICATING A POROUS MATRIX

(71) Applicant: The Regents of the University of California, Oakland, CA (US)

(72) Inventor: Lawrence Kulinsky, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 78 days.

(21) Appl. No.: 16/111,030

(22) Filed: Aug. 23, 2018

(65) Prior Publication Data
US 2019/0061258 A1 Feb. 28, 2019

Related U.S. Application Data

(60) Provisional application No. 62/549,681, filed on Aug. 24, 2017.

(51) Int. Cl.
*B29C 41/02* (2006.01)
*B29C 64/35* (2017.01)
(Continued)

(52) U.S. Cl.
CPC ............ *B29C 64/35* (2017.08); *B22F 3/1055* (2013.01); *B23K 26/342* (2015.10); *B28B 1/001* (2013.01); *B29C 64/153* (2017.08); *B29C 64/165* (2017.08); *B29C 64/188* (2017.08); *B29C 64/357* (2017.08); *B32B 5/30* (2013.01); *B32B 5/32* (2013.01); *B33Y 10/00* (2014.12); *B33Y 40/00* (2014.12); *B33Y 70/00* (2014.12); *B33Y 80/00* (2014.12); *B22F 2003/1059* (2013.01);
(Continued)

(58) Field of Classification Search
CPC ..... B22F 3/1055; B28B 1/001; B29C 64/153; B29C 64/165; B29C 64/357; B29D 99/0089; B29K 2009/06; B29K 2023/06; B29K 2023/12; B29K 2025/06; B29K 2027/06; B29K 2069/00; B29K 2077/00; B29L 2031/608; B29L 2031/721; B33Y 10/00
USPC ...... 264/37.29, 113, 331.13, 331.15, 331.17, 264/331.19, 460, 461, 462, 463, 497; 219/121.17, 121.66, 121.85
See application file for complete search history.

(56) References Cited

U.S. PATENT DOCUMENTS 6,143,378 A  11/2000 Harwell et al.
2006/0165546 A1* 7/2006 Yamada .................. B33Y 10/00
419/6

(Continued)

OTHER PUBLICATIONS

Wohlers, Terry T. "Wohlers Report 2008", published by Wohlers Associates, Inc. (2008), p. 12.*

(Continued)

*Primary Examiner* — Leo B Tentoni
(74) *Attorney, Agent, or Firm* — Nguyen Tarbet LLC (57) ABSTRACT

A method for the additive manufacturing of a closed-cell porous matrix is described herein. A powder-bed, additive manufacturing process is used to create a piece with partially-closed cavities filled with unfused powder. Vacuum, negative pressure, positive pressure, or solvent is used to evacuate the powder from the cavities. Finally, a fresh layer of powder is used to cover the opening of the cavity and the powder is fused on top to close the opening.

16 Claims, 11 Drawing Sheets

(51) Int. Cl.
  *B33Y 10/00* (2015.01)
  *B33Y 80/00* (2015.01)
  *B33Y 70/00* (2020.01)
  *B22F 3/105* (2006.01)
  *B29C 64/153* (2017.01)
  *B29C 64/165* (2017.01)
  *B33Y 40/00* (2020.01)
  *B23K 26/342* (2014.01)
  *B28B 1/00* (2006.01)
  *B29C 64/188* (2017.01)
  *B32B 5/30* (2006.01)
  *B32B 5/32* (2006.01)
  *B29C 64/357* (2017.01)
  *B22F 3/11* (2006.01)
  *B29L 31/60* (2006.01)
  *B29K 27/06* (2006.01)
  *B29L 31/00* (2006.01)
  *B29K 25/00* (2006.01)
  *B29K 23/00* (2006.01)
  *B29K 9/06* (2006.01)
  *B29K 69/00* (2006.01)
  *B29K 77/00* (2006.01)

(52) U.S. Cl.
  CPC ... *B22F 2003/1106* (2013.01); *B22F 2998/10* (2013.01); *B22F 2999/00* (2013.01); *B29K 2009/06* (2013.01); *B29K 2023/06* (2013.01); *B29K 2023/12* (2013.01); *B29K 2025/06* (2013.01); *B29K 2027/06* (2013.01); *B29K 2069/00* (2013.01); *B29K 2077/00* (2013.01); *B29L 2031/608* (2013.01); *B29L 2031/721* (2013.01)

(56) References Cited

U.S. PATENT DOCUMENTS

| | | | | |
|---|---|---|---|---|
| 2012/0107496 | A1* | 5/2012 | Thoma | B29C 64/165 427/202 |
| 2012/0183701 | A1* | 7/2012 | Pilz | B22F 3/1055 427/504 |
| 2015/0052898 | A1* | 2/2015 | Erno | B22F 3/1055 60/726 |
| 2016/0074940 | A1* | 3/2016 | Cote | B22F 3/1055 134/23 |

OTHER PUBLICATIONS

Dilip, J. J. S. et al. "Use of friction surfacing for additive manufacturing." Materials and Manufacturing Processes 28.2 (2013): 189-194.

Sun et al. Fabrication of regular polystyrene foam structures with selective laser sintering. vol. 13, Dec. 2017, pp. 346-353.

* cited by examiner

POWDER BED ADDITIVE MANUFACTURING METHOD OF FABRICATING A POROUS MATRIX

CROSS REFERENCE

This application claims priority to U.S. Provisional Application No. 62/549,681, filed Aug. 24, 2017, the specification(s) of which is/are incorporated herein in their entirety by reference.

FIELD OF THE INVENTION

The present invention relates to powder bed additive manufacturing of a closed-cell porous matrix.

BACKGROUND OF THE INVENTION

Figure 6A:
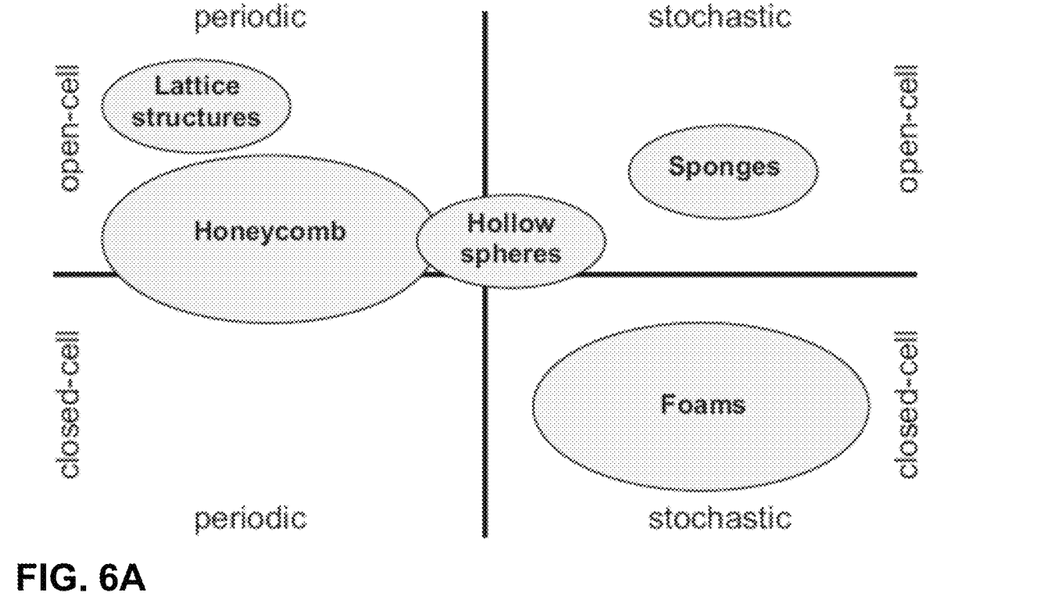
FIG. 6A shows a chart for the classification of cellular materials.

Cellular solids are space-filling assemblies of prismatic or polyhedral cells with solid edges or faces. Solid cellular materials can be classified into lattices (with solid edges and open faces), honeycomb structures (two-dimensional arrays of cells with solid faces), as well as sponges (solids filled with inter-connected cavities) and foams (structures where cavities are not connected). Examples of these cellular materials are presented in FIGS. 5A-5F. These structures can be further classified into periodic and stochastic assemblies as well as into open-cell or closed-cell topologies as represented on the chart in FIG. 6A.

Figure 6B:
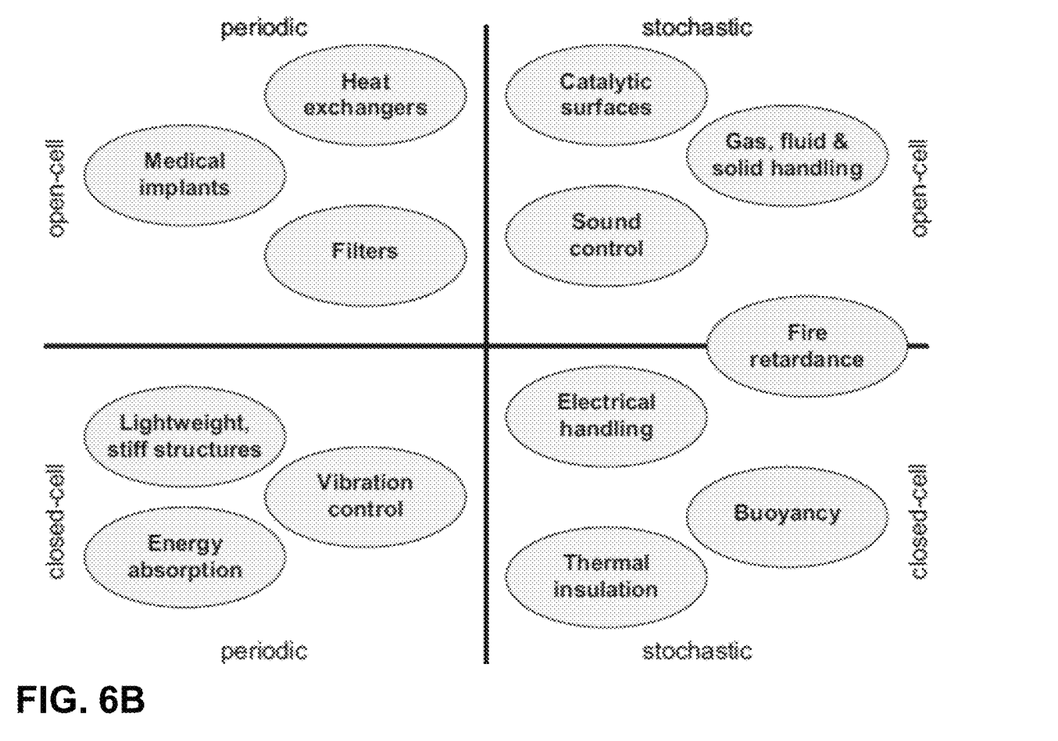
FIG. 6B shows a chart for the application groups of cellular materials.

Cellular solids have low relative density $\bar{\rho}$ (defined as the ratio of the volume of lattice material to the volume of the unit cell)—usually below 0.3 and can have a number of advantages over solid (non-cellular) counterparts such as lower weight for structural applications, superior thermal and sound insulation, better energy absorption, and higher surface area, making the cellular materials a great fit for many engineering applications. Due to these advantages, cellular structural topologies appear ubiquitously in nature—from bees' honeycombs to internal bones' structure and plants' morphology. Non-limiting examples of applications for the various classes of cellular materials are presented in FIG. 6B.

Depending on topologies of unit cells, the cellular materials can be broadly separated into bending-dominated and stretching-dominated structures where stiffness and mechanical strength of stretching-dominated structures are typically superior to that of bending dominated structures. It has been demonstrated that stretching-dominated behavior is mainly associated with closed-cell morphology.

There are a wide variety of fabrication approaches to manufacture open-cell lattices with metal alloys (for example, via weaving wires, additive manufacturing with e-beam and selective laser melting, stereolithography with subsequent metal plating, deformation forming, or investment casting. Similarly, additive manufacturing techniques such as selective laser sintering (SLS) and microstereolithography can be used to produce polymer lattices. Meanwhile, majority of sponges and foams are produced by air bubbling or gas generation during matrix solidification, resulting in distribution of pore sizes. One approach to produce a regular foam employs consolidation of hollow metal spheres that fuse together (for example, via isostatic pressure), but this approach results in several types of porosities—those of inner voids inside the spheres and the interstitial voids between the spheres, additionally, only low relative density is possible to achieve with this approach. Modification of hollow sphere consolidation technique employs several types of metal powder where smaller powder fills the interstitial sites between the hollow spheres. Presently, no fabrication approach exists that would produce regular polymeric foam.

Additive manufacturing systems are used to print or otherwise build 3D substrates from digital representations of the 3D substrates using one or more additive manufacturing techniques. Examples of commercially available additive manufacturing techniques include jetting, selective laser sintering, powder/binder jetting, electron-beam melting, and stereolithographic processes. For each of these techniques, the digital representation of the 3D substrates is initially sliced into multiple horizontal layers. For each sliced layer, a tool path is then generated, which provides instructions for the particular additive manufacturing system to print the given layer.

A subset of additive manufacturing methods is the powder-bed methods. Using current powder-bed methods, it is 'impossible' to fabricate a hollow but fully enclosed element. This is because the un-sintered powder within the element cannot be drained. While other additive manufacturing methods such as filament based methods can be used to manufacture hollow substrates, there are certain limitations to these methods which are solved by powder-bed methods. For example, powder-bed methods can be used with a much wider range of materials, unlike filament based methods.

It would be beneficial to be able to fabricate substrates that could have enclosed cavities since it could provide lighter substrates without significant sacrifice in the substrate's strength and enhance properties of the substrate (for example, lowered heat conduction while retaining high electrical conduction). It is also possible to create a functionally graded substrate where a property (such as density, heat conduction, etc.) of the substrate in specific area of the substrate would depend on size and spacing of the enclosed cavities. This present invention, for the first time, demonstrates additive manufacturing approach for production of regular polymeric foams.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In the present invention, the procedure to fabricate regular polymer foams is proposed and demonstrated for the first time. Multi-step selective laser sintering (SLS) process is utilized to produce polystyrene parts with regularly spaced porosities, which may be referred to herein as "regular foam". Mechanical compression testing was performed on the regular foam parts and on solid polystyrene parts with the same dimensions as the fabricated foam parts. Testing results indicate that the solid polystyrene samples have compressive strength in the range between 36.00 and 42.73 MPa, while less dense regular foam samples have compressive strength in the range between 27.85 and 39.38 MPa. The Young's modulus deduced from the stress-strain curves for solid samples is in the range between 779.2-879.0 MPa for solid samples and 771.3-885.9 MPa for the foam samples. These results demonstrate that it is possible to produce the foam samples with mechanical performance nearly identical to that of the solid samples. Furthermore, the regular foam can have a wider range of performance due to manufacturing variations.

In some aspects, the present invention features a method for the additive manufacturing of a closed-cell porous matrix. A powder-bed, additive manufacturing process may be used to create a piece with partially-closed cavities filled with unfused powder. Vacuum, negative pressure, positive pressure, or solvent may then be used to evacuate the powder from the cavities. Finally, a layer of powder may be used to cover the opening of the cavity and the powder may be fused on top to close the opening.

Figure 4:
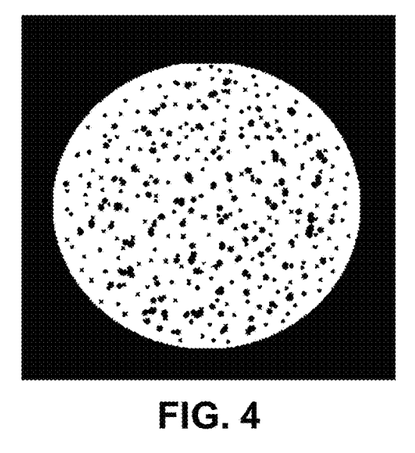
FIG. 4 illustrates a powder-filled cavity that is traditionally formed when formation of is attempted by a powder-bed additive manufacturing method.
Figure 5A:
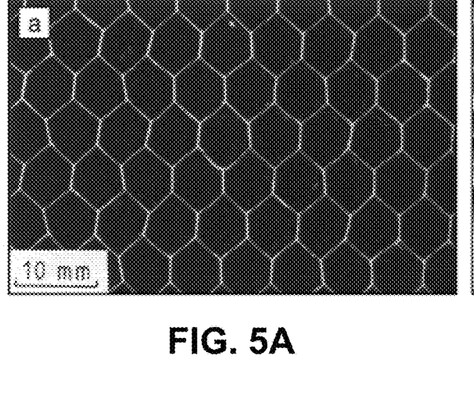
Figure 5B:
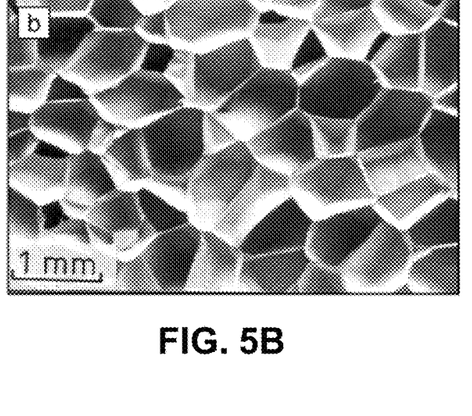
Figure 5C:
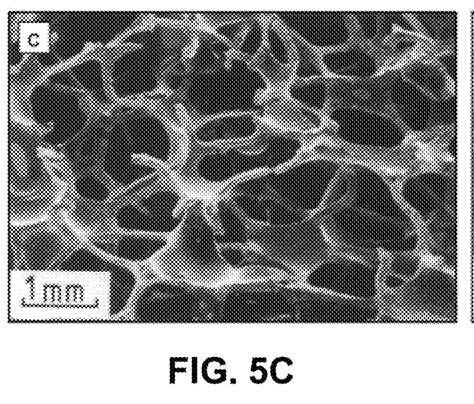
Figure 5D:
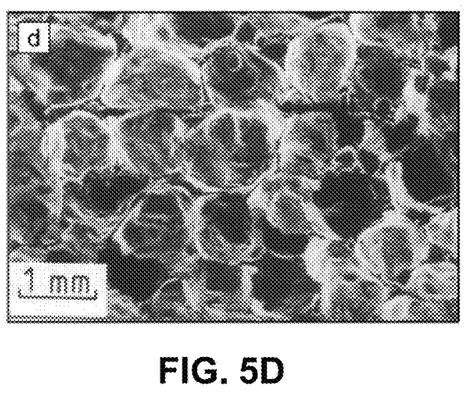
Figure 5E:
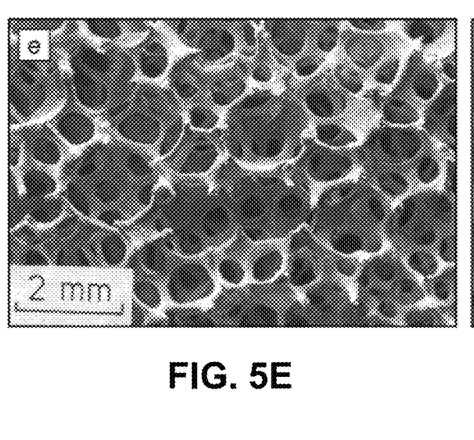
Figure 5F:
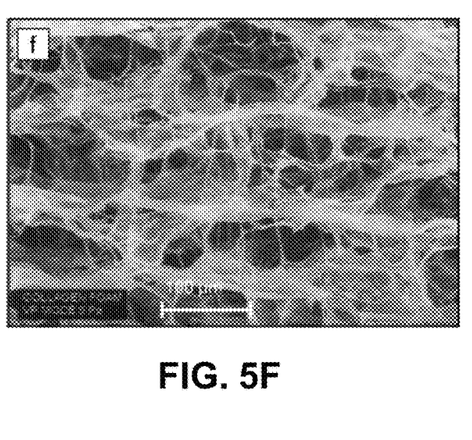

Traditional powder bed additive manufacturing processes can produce various geometries, but cannot produce empty cavities in the material since by the nature of the process, powder would be left behind (FIG. 4). A closed-cell, porous substrate with small cavities (spherical or other shape) is advantageous as it would result in, for example, lighter substrates without a large sacrifice in strength, or electrically conductive substrates that could have thermally insulative properties. Distribution of cavities with various sizes and cavity density in the body of the substrate would also result in functionally-graded material.

Figure 3A:
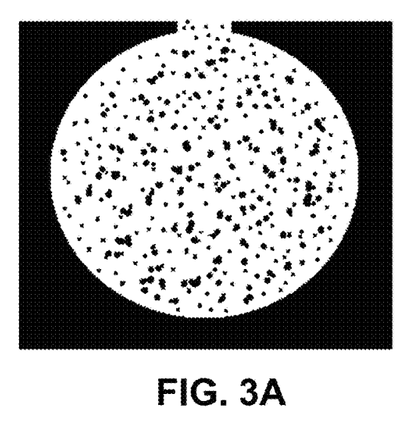
In FIG. 3A, a cavity with having an opening to a top layer is filled with unbound powder.
Figure 3B:
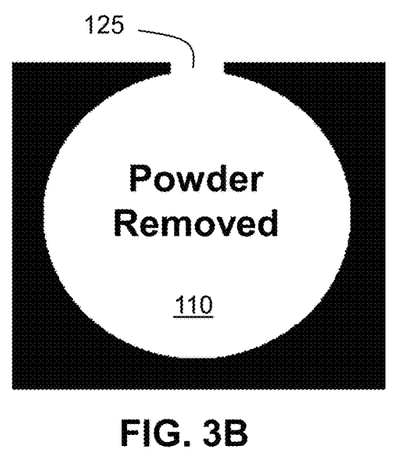
FIG. 3B shows the cavity after removal of the powder.
Figure 3C:
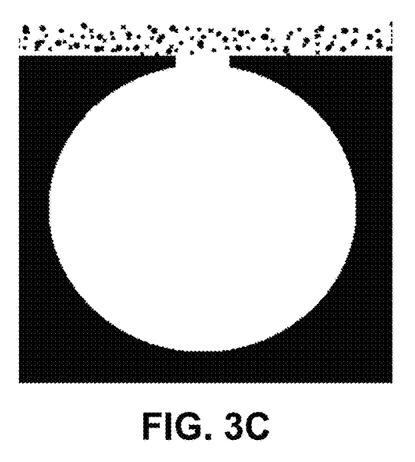
FIG. 3C shows the cavity after deposition of an additional powder layer.
Figure 3D:
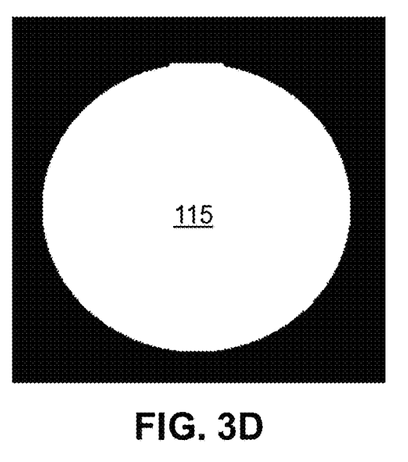
FIG. 3D shows the cavity after additional powder layers have been developed to close the cavity.

In some embodiments, the method of fabricating a closed-cell, porous substrate may involve the following steps: (1) creating a convergent (partially closed) cavity (FIG. 3A), (2) removing the powder from the cavity (FIG. 3B), and (3) adding a fresh layer of powder on top and develop the powder to close off the cavity (FIG. 3C). Some powder might get inside the cavity, but typically stochastic or random arrangement of powder can guarantee that after several layers, the cavity will be closed off. The size of the hole to be left open and its relationship to the powder diameter can be determined experimentally for each powder system.

Presently, there are no additive manufacturing processes which may produce enclosed cavities except limiting processes such as friction surfacing where open cavities (for example drilled in a piece of metal) are then closed via friction heating and deposition by rotating the rod of deposition material against the entrance to the cavity until under the friction heating and shear stress the layer of material is deposited over the opening. Understandably, such process is extremely cumbersome if many small cavities are to be produced. The present invention has many advantages over friction surfacing, wire melting or similar processes where the method of producing cavities is to first form a hole and then use external means, such as friction rod or wire that can be melted, to close off the cavity. The method described herein is faster, is appropriate for large scale application (openings to an array of cavities are positioned on the same layer and thus can be closed off at the same powder developing pass and cavities can be positioned throughout the depth of the substrate), and can be manufactured with the same piece of equipment for whichever additive manufacturing process is used with the only peripheral equipment required is an in-house vacuum or other tool to clear the cavities of powder.

One of the unique and inventive technical features of the present invention is the formation of a closed-cell porous substrate using a powder-bed additive manufacturing process. Without wishing to limit the invention to any theory or mechanism, it is believed that the technical feature of the present invention advantageously provides for the ability to produce a lighter substrate without significantly sacrificing its strength. Another unique and inventive technical feature of the present invention is the removal of unbound powder from a partially enclosed cavity before the cavity is sealed with subsequent layers of bound powder. Without wishing to limit the invention to any theory or mechanism, it is believed that the technical feature of the present invention advantageously provides for the ability to produce a lighter closed-cell porous substrate without sacrificing its mechanical integrity. It is also believed that this approach may be superior to lattices or metal foam topologies and may provide enhanced properties to the material. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which:

FIGS. 3A-3D show a non-limiting example diagram of an empty cavity formed by a powder-bed additive manufacturing method of the present invention.

FIGS. 5A-5F are non-limiting examples of engineered cellular materials: (FIG. 5A) aluminum honeycomb, (FIG. 5B) closed-cell polyethylene foam, (FIG. 5C) open-cell nickel foam, (FIG. 5D) closed-cell glass foam, (FIG. 5E) open-cell zirconia foam, and (FIG. 5F) collagen-based porous scaffold used in tissue engineering.

DESCRIPTION OF PREFERRED EMBODIMENTS

Following is a list of elements corresponding to a particular element referred to herein:

100 substrate
105 substrate layer
110 cavity
115 closed-cell
120 channel
125 channel opening As used herein, the term "additive manufacturing process" refers to a process by which a three dimensional substrate is manufactured layer-by-layer. Non-limiting examples of additive manufacturing processes include 3D printing, rapid prototyping, direct digital manufacturing, additive fabrication, selective laser sintering, selected laser melting, direct metal laser sintering, electron-beam melting, and binder jetting. As a non-limiting example process, the selective laser sintering process may comprise dispersing a thin layer of powder on a platform, tracing a cross-section of a desired substrate in the power with a laser beam to heat the powder to the point where particles are sintered together, and repeating the powder dispersing and laser tracing steps until the desired substrate has been formed by the sintered powder. Additive manufacturing processes are known to one of ordinary skill in the art.

As used herein, the term "porous" refers to small voids in an interior of a solid substrate. These voids or "pores" are closed-cell and may be empty or filled. In a non-limiting example, the pores may be empty. In alternative embodiment, the pores may be filled with a different material than the material of the substrate. This embodiment where a different material fills the pores may provide a foam substrate that has unique properties, such as mechanical or electrical.

Referring now to FIGS. 2A and 3A-3D, in some embodiments, the present invention features a method of fabricating a closed-cell, porous substrate (100) using an additive manufacturing process. In some embodiments, the method may comprise: (a) depositing a layer of a first powder on a target surface and developing a selected portion of said layer according to the additive manufacturing process. Preferably, the powder in the selected portion binds together to form a solid layer and the powder outside of the selected portion is unbound. The deposited layer forms a target surface for a subsequent layer. The method continues as follows: (b) repeating step a, layer by layer, until a three-dimensional porous substrate comprising a plurality of partially closed cavities (110) is formed from the solid layers, with each cavity (110) comprising one or more channels (120), each channel (110) having an opening (125) at an uppermost layer, and the cavities (110) are filled with the unbound powder; (c) removing the unbound powder from the cavities (110) through the openings (120) of the channels; and (d) depositing and developing one or more layers of a second powder over the channel openings (125) until the channel openings are closed, thereby forming the cavities into closed-cells (115), and the substrate into said closed-cell, porous substrate (100). In some embodiments, the additive manufacturing process may comprise selective laser sintering, selected laser melting, direct metal laser sintering, electron-beam melting, or binder jetting.

In other embodiments, the present invention features a method of fabricating a closed-cell, porous substrate (100) from one or more polystyrene powders using a selective laser sintering process. The method may comprise: (a) depositing a layer of a first polystyrene powder on a target surface and developing a selected portion of said layer according to the selective laser sintering process such that the powder is sintered together to form a solid layer, the powder outside of the selected portion comprises an unsintered powder, and the deposited layer forms a target surface for a subsequent layer; (b) repeating step a, layer by layer, until a three-dimensional porous substrate comprising a plurality of partially closed cavities (110) is formed from the solid layers, with each cavity (110) comprising one or more channels (120), each having an opening (125) at an uppermost layer, and the cavities (110) are filled with the unsintered powder; (c) removing the unsintered powder from the cavities (110) through the openings (125) of the channels; and (d) depositing and developing one or more layers of a second polystyrene powder over the channel openings (125) until the channel openings are closed, the cavities become closed-cells (115), and the substrate forms said closed-cell, porous substrate (100).

Figure 2A:
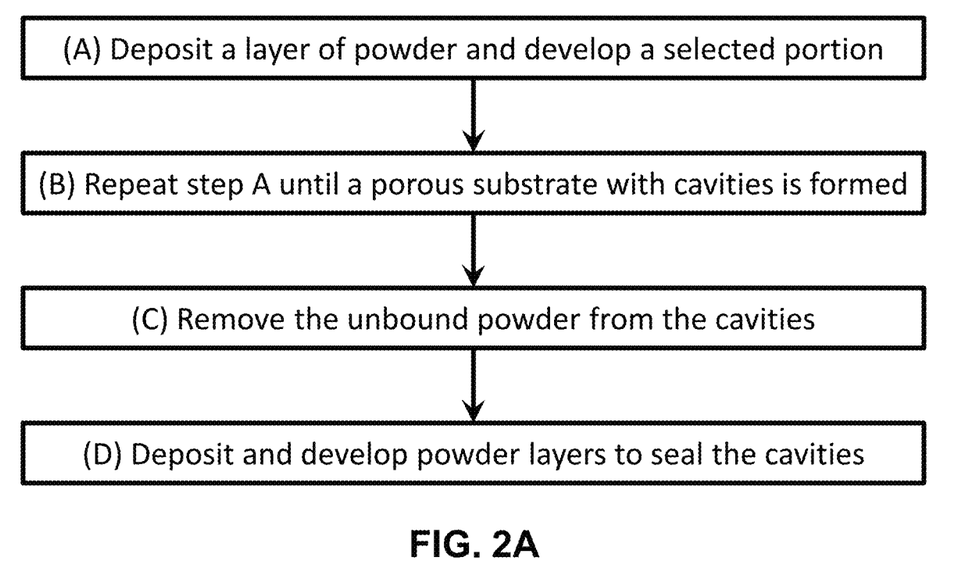
FIG. 2A shows a non-limiting method flow diagram for the formation of a closed-cell porous substrate of the present invention.
Figure 2B:
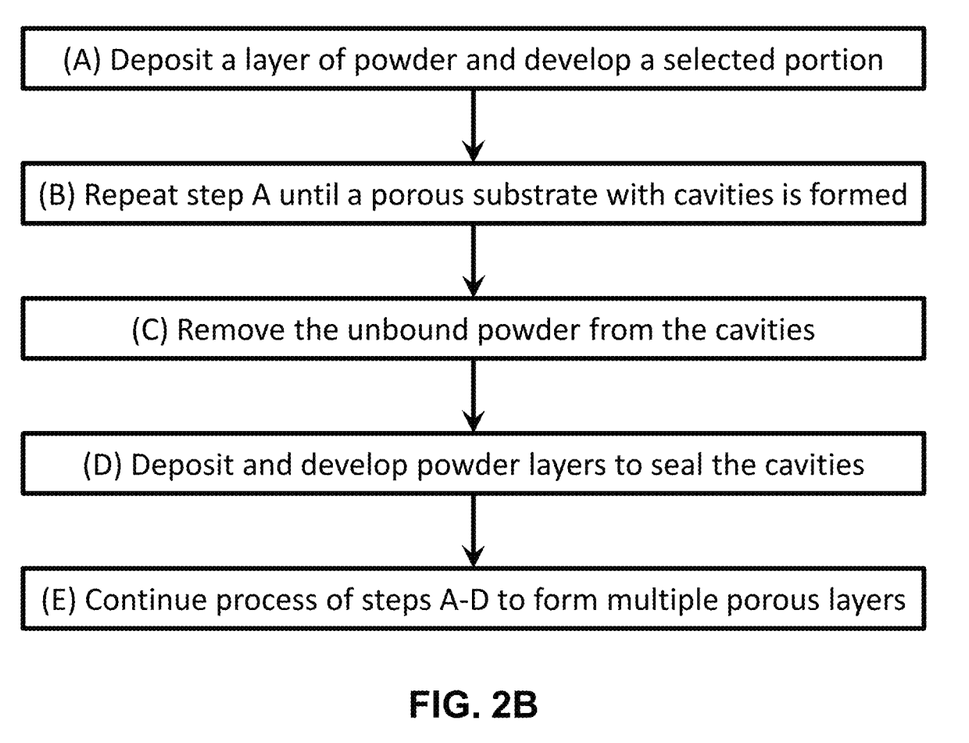
FIG. 2B shows a non-limiting method flow diagram for the formation multiple closed-cell porous layers.

According to one embodiment, as shown in FIG. 2B, the methods may further comprise repeating steps a-d to form a plurality of substrate layers (105), each comprising a plurality of closed cells (115). The target surface for each new layer is the top of the previous layer. Without wishing to limit the invention to any particular theory or mechanism, it is believed that this method of forming porous substrates is superior to other methods since it utilizes existing additive manufacturing machinery; is scalable in nature; is customizable; is able to produce multiple pores, also referred to a closed-cells; and is tuneable in the size, shape, content and spacing of the pores.

In still another embodiment, the present invention features a closed-cell porous substrate (100). The substrate may comprise one or more substrate layers (105), each layer (105) having a plurality of closed-cells (115). In some embodiments, the substrate (100) may be fabricated using the methods described herein. For example, the substrate (100) may be fabricated from one or more powders using an additive manufacturing process such as selective laser sintering, selected laser melting, direct metal laser sintering, electron-beam melting, or binder jetting. In selected embodiments, the closed-cell pores (115) may be arranged in a staggered, alternating, gradient or aligned arrangement. For examples, the closed-cells (115) may be arranged in an array of rows and columns. In some embodiments, a closed-cell (115) may be separated from neighboring closed-cells (110) by a distance ranging from about 1 mm to about 10 mm.

In some preferred embodiments, the closed-cell pores (110) may be empty. In other embodiments, the cavities (110) may be partially or completely filled with a filler prior to closing the channel openings (125) to form filled closed-cells. As a non-limiting example, the filler may comprise a fluid, liquid, gas, powder, metallic material, plastic, or wax. Without wishing to limit the invention to a particular theory or mechanism, a substrate having filled cells may have improved physical or electrical properties over an analogous substrate with unfilled cells.

In some embodiments, the first powder and the second powder may be the same. In other embodiments, the first and second powders may each comprise a plurality of particles, and the particles of the second powder may be larger in diameter than those of the first powder. In other embodiments, the first or second powders may comprise a polymer, ceramic, glass or metal powder. As a non-limiting example, the polymer may comprise polystyrene, polyamide, polyethylene, polypropylene, polyacrylonitrile-butadiene-styrene (ABS), polyvinyl chloride (PVC) or polycarbonate.

In other embodiments, a shape of the cavities may comprise a sphere, ellipsoid, cylinder, cube, cone, tetrahedron, or polyhedron. In preferred embodiments, the diameter of the cavities is chosen such that the powder can be removed through the channels. In one embodiment, the diameter of the cavities may be about 1-20 mm. In other embodiments, the diameter of the cavities may be about 0.1, 0.25, 0.5, 0.75, 1, 2, 5, 10, 15, 20, 25, 50, or 100 mm. In further embodiments, the substrate (100) may comprise a polymer foam with a narrow distribution of pore size.

According to yet further embodiments, the substrate (100) may have a density that is considerably lower than that of an analogous solid substrate. For example, the substrate (100) may have a density that is 5%, 10%, 20%, 30%, 40%, 50%, 60%, 70%, 80%, 90% or 99% lower than that of an analogous solid substrate.

In preferred embodiments, the size of the channels may be large enough that the powder can be removed and also small enough that it can be sealed with subsequent layers of powder. For example, in one embodiment, the diameter of the channels may be about 0.1-3 mm to allow for removal of the powder while being able to be sealed. In other embodiments, the diameter of the channels may be about 0.05, 0.1, 0.25, 0.5, 0.75, 1, 1.5, 2, 2.5, 3 or 5.

According to another embodiment, the unbound powder may be removed by vacuum, negative pressure, positive pressure, or solvent. In a non-limiting example, positive pressure may be applied to an opening of a channel to cause a flow of liquid or gaseous fluid in through the channel, through the cavity and out through a second channel such that the flow through the cavity removes the powder. As another example, negative pressure may be applied to an opening of a first channel to cause a flow of liquid or gaseous fluid in through a second channel, through the cavity and out through the first channel, thus the flow through the cavity removes the powder.

In a preferred embodiment, the substrate (100) may be used in applications such as energy absorption, vibration control, electrical handling, fire retardance, buoyancy, thermal insulation, or the production of lightweight and stiff structures. In another embodiment, the substrate may be a electrical conductor and a thermal insulator.

EXAMPLES

The following is provided as a non-limiting example of the present invention, in particular, the formation of a regular closed-cell polystyrene foam by selective laser sintering and the testing of the compressive strength and modulus of the foam in comparison to solid samples. The example are for illustrative purposes only and are not intended to limit the invention in any way. Equivalents or substitutes are within the scope of the invention.

Herein, a manufacturing approach that includes multi-stage selective laser sintering (SLS) to fabricate regular foams from polystyrene is demonstrated. Details of the process flow are discussed below.

Fabrication:

The samples of the regular polystyrene foam were fabricated using selective laser sintering (SLS) on Sinterstation™ 2000 system that utilizes CO2 laser to melt serially deposited layers of polymer powder in order to create three-dimensional substrates. In the fabrication process the laser power was in the range between 15 W and 18.8 W, a part bed temperature was maintained between 80 and 100° C., right and left feed bin temperature was set at 57° C., a beam speed was 1676.4 mm/s, a powder layer thickness was 0.15 mm, an oxygen content was below 0.1%.

Figure 1A:
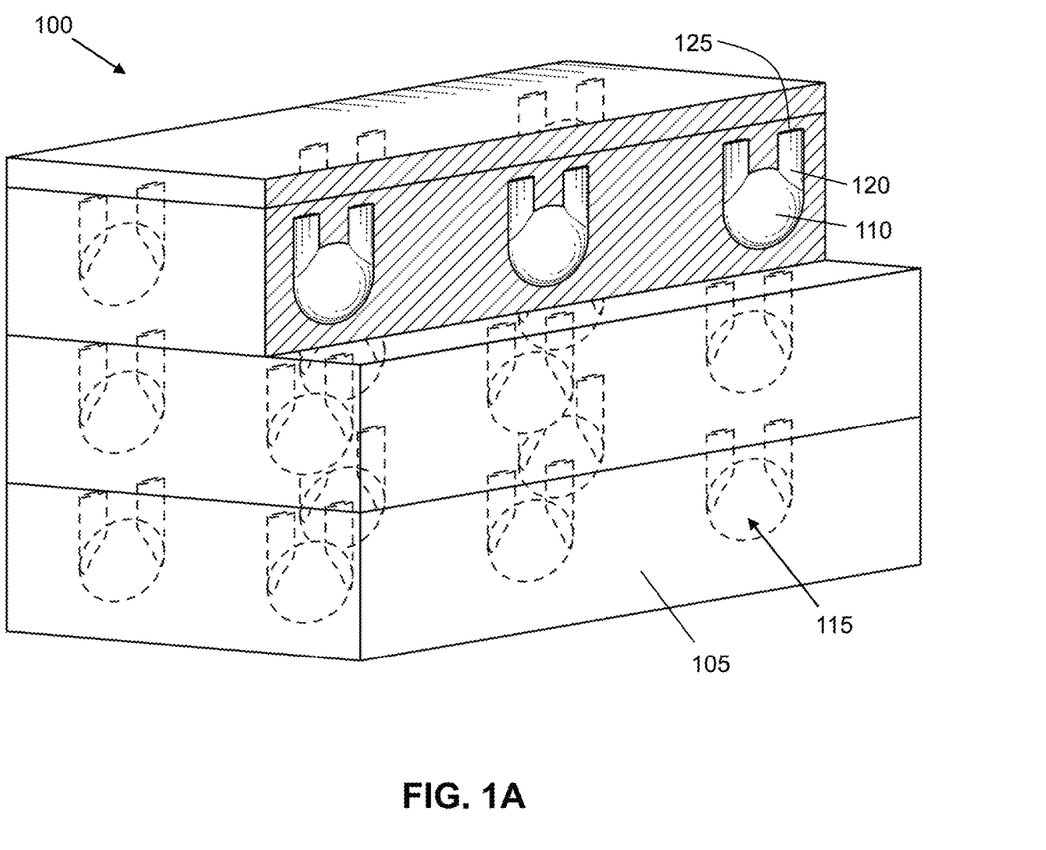
FIG. 1A is a non-limiting example a foam substrate of the present invention.
Figure 1B:
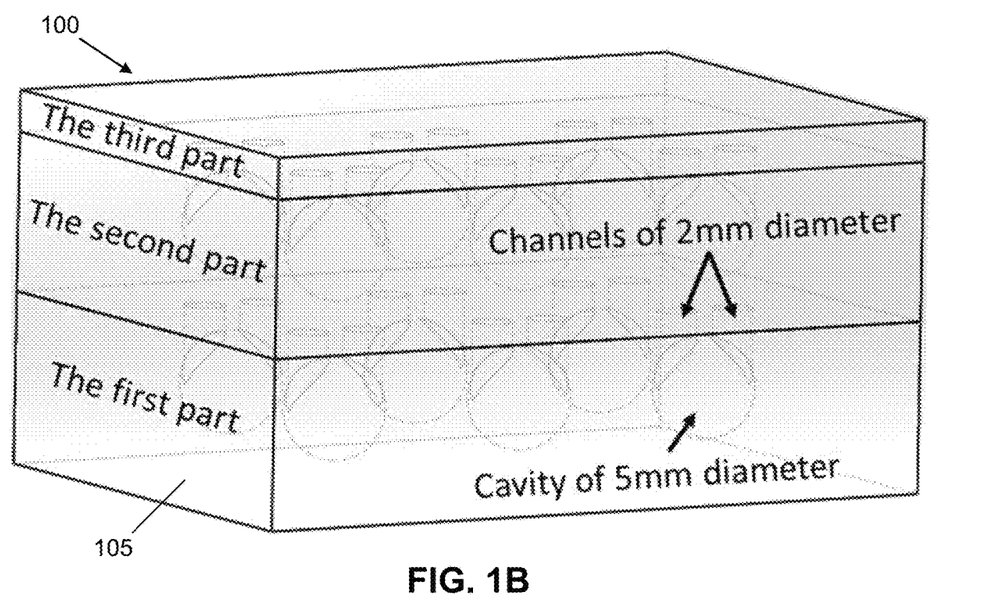
FIG. 1B-1C shows a fabricated foam structure with cavities having a diameter of 5 mm.
Figure 7A:
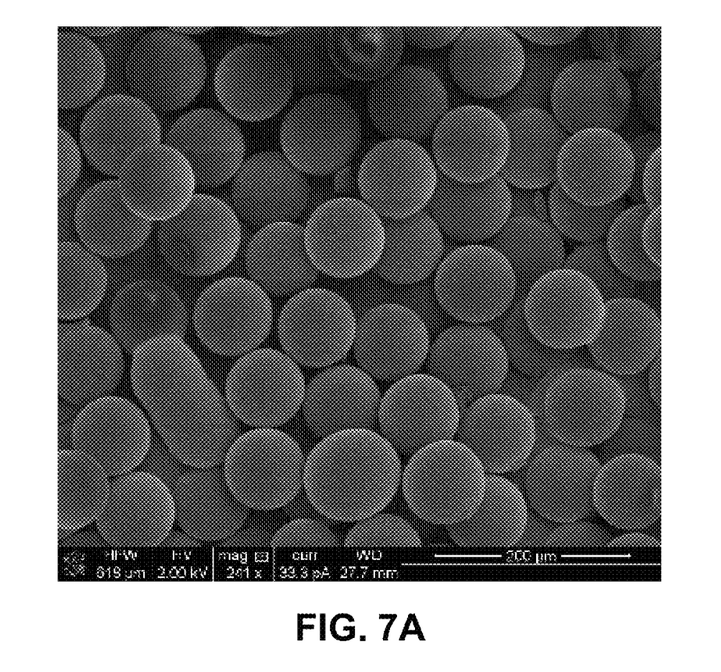
FIG. 7A shows a SEM image of polystyrene PS 100 powder.

Polystyrene powder PS100 (Advanced Laser Materials, Temple, Tex.) with a glass transition temperature of 105° C. and a mean particle size of about 80 µm was used. The SEM picture of the powder is presented in FIG. 7A. The fabricated regular foam samples had three parts fused together that contained 12 cavities of 5 mm diameter each. Six cavities were contained in the first part and six cavities—in the second part as shown in FIG. 1B. The actual cross-section of the produced substrate is presented in FIG. 1C. The foam is produced in sequential steps. Initially, the first part is produced containing six 5 mm diameter cavities that are filled with unbounded powder. Each cavity also contains two 2 mm diameter channels. Blowing compressed air into one of these channels helps to clear out powder from the cavities. Once the first layer is produced, it is set on the part platform and the second part is produced on top of the first part. Several laser scans on the top surface of the first part was utilized to heat up the top surface in order to have the second part to fuse to the first part. Once the assembly is produced, the compressed air is used to clear the cavities in the second layer. Finally, the third part, a lid, is produced that is fused to the top of the assembly.

Figure 8A:
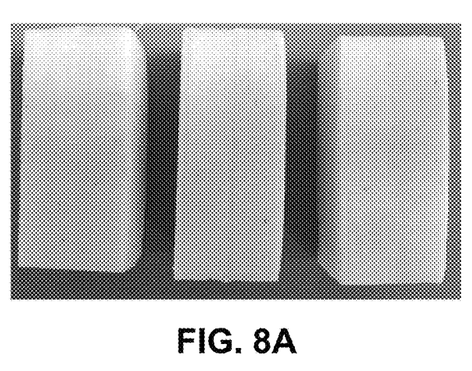
FIG. 8A-8B are fabricated foam samples of the present invention: Foam 1, Foam 2, and Foam 3 (FIG. 8A, left to right); and solid samples: Solid 4, Solid 5, and Solid 6 (FIG. 8B, left to right).
Figure 8B:
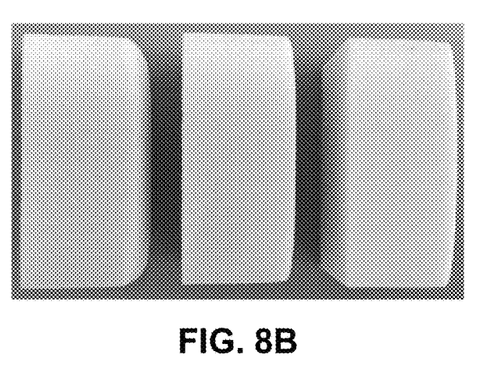

Three regular foam samples (FIG. 8A), Foam 1, Foam 2, and Foam 3, as well as three solid substrates (FIG. 8B), Solid 4, Solid 5, and Solid 6, which are solid blocks of polystyrene without cavities, have been produced. Original size of these specimens was 35 mm×25 mm×18 mm and they were cut to uniform size of 32.5 mm×22 mm×16.5 mm in preparation for mechanical testing. The samples were weighed and measured in order to calculate the effective density.

Figure 8C:
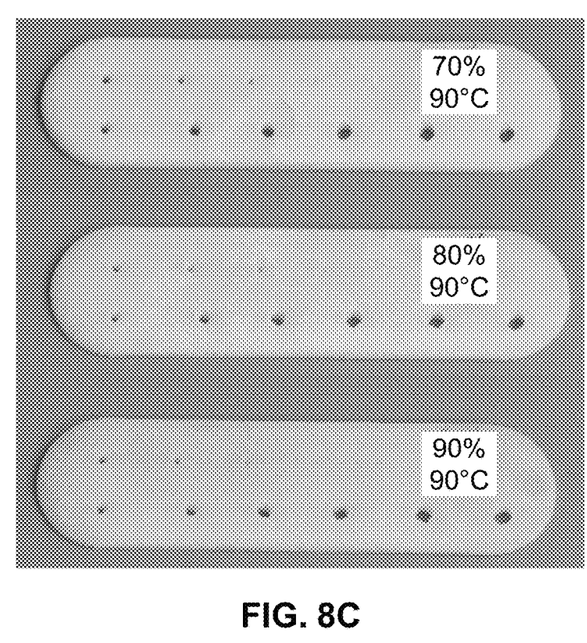
FIG. 8C shows the bottom face of samples on a part bed platform fabricated at a temperature of 90° C. and laser power at 70, 80, and 90% as indicated.

Optimization of Fabrication Parameters:

In order to successfully produce samples of regular polystyrene foam it is necessary to remove unbounded powder from the cavities. A range of test parts with the holes ranging in diameter from 130 microns to 3 mm was produces at various laser power and part bed temperatures. FIG. 8C presents a set of test parts used to optimize the fabrication setting of the powderbed fusion machine. The lower laser power is and the lower the powder bed temperature is, the smaller the holes that can be successfully cleaned off powder. However, if low laser power and powder bed temperature compromise quality of the part and subsequent bonding between parts of the assembly. In some preferred embodiments, the optimum fabrication parameters for SLS process may be the laser power of 18.8 W (90%) and temperature of part bed of 90° C.

Figure 9A:
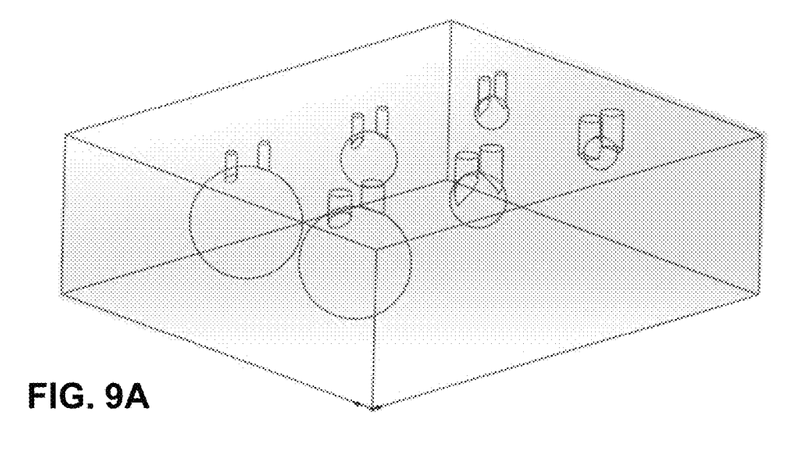
FIG. 9A is an exemplary test substrate containing cavities with diameters of 10, 5, and 3 mm having 1 or 2 mm diameter channels for clearing off powder.
Figure 9B:
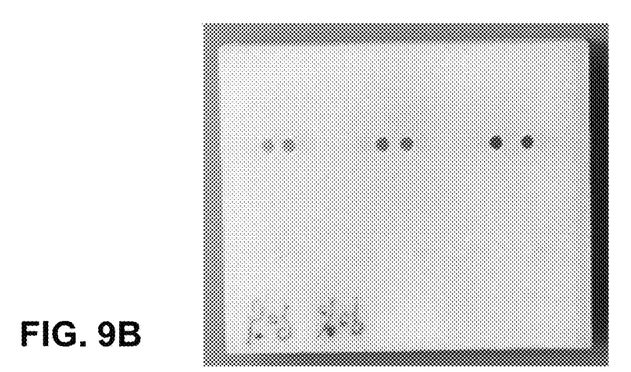
FIG. 9B shows a top view photograph of the substrate in FIG. 9A.
Figure 9C:
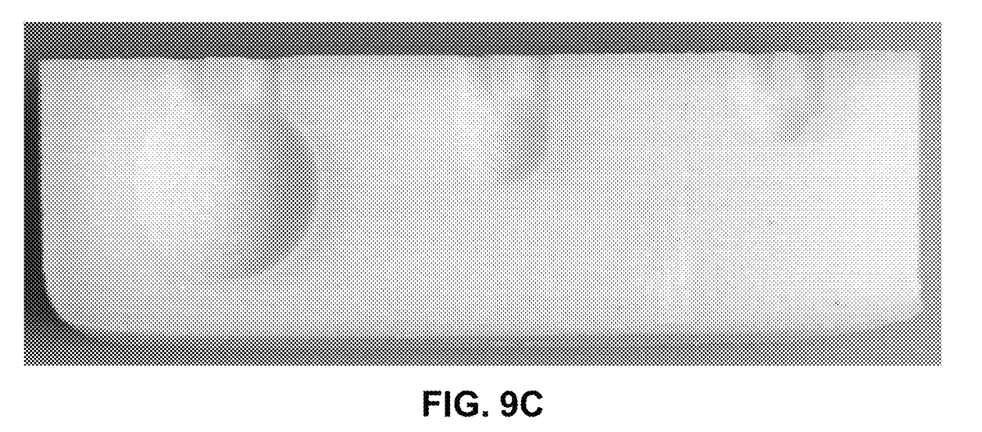
FIG. 9C shows a cross-sectional view of the substrate in FIG. 9A.

These SLS fabrication settings were used to produce additional substrates as shown in FIGS. 9A-9C. The substrates contained set of cavities of three different diameters of 10, 5, and 3 mm that had two types of channels (of 2 mm and 1 mm) for clearing off powder from cavities. In some embodiments, the combination of 5 mm diameter cavities with 2 mm diameter clearing channels may be appropriate to use for fabrication of regular foam samples.

Figure 1C:
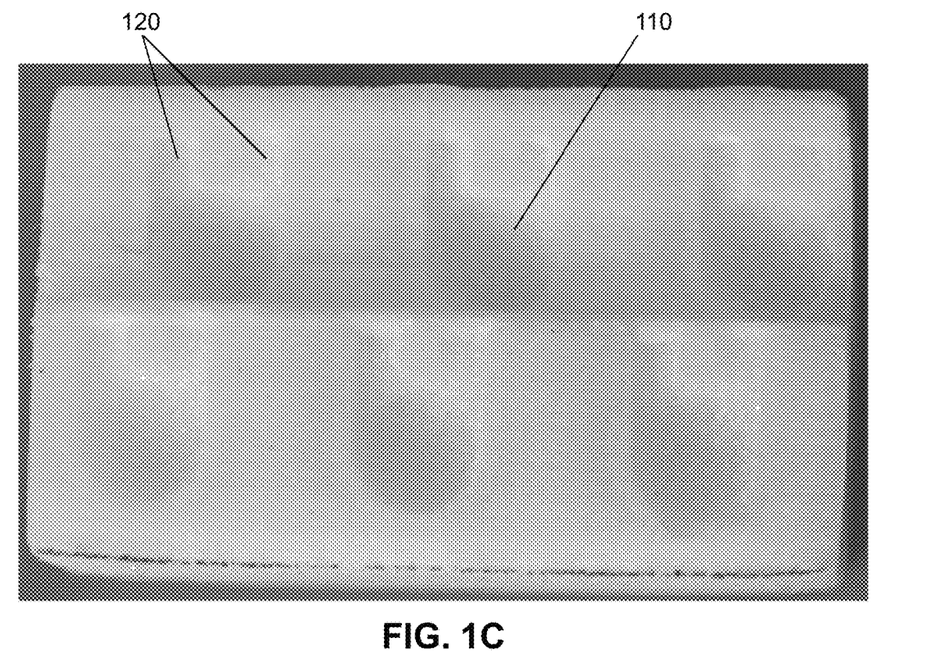

The complete process flow for production of the regular foam samples included production of the first part of the polystyrene foam; clearing the cavities of powders with the compressed air; positioning the part on the powder bed and levelling the roller of the machine to have it less than 0.15 mm above the top surface of the part; performing the laser scan of the top surface to facilitate subsequent adhesion of the powder to the top face; initiate building of the second part of the foam; clear out cavities of the fabricated part; position the produced assembly of the powder bed of the part platform of the machine and level off the roller to be less than 0.15 mm above the top face of the assembly; repeat the laser scan four times on the top surface; fabricate the third part (lid) of the foam sample. FIG. 1C presents the cross-section of the fabricated regular polystyrene foam sample.

Mechanical Testing: The uniaxial compressive testing of six specimens was performed using a servo-electric INSTRON 8862 frame, equipped with a FastTrack 8800 controller and a National Instrument SCXI Data Acquisition system.

Figure 10:
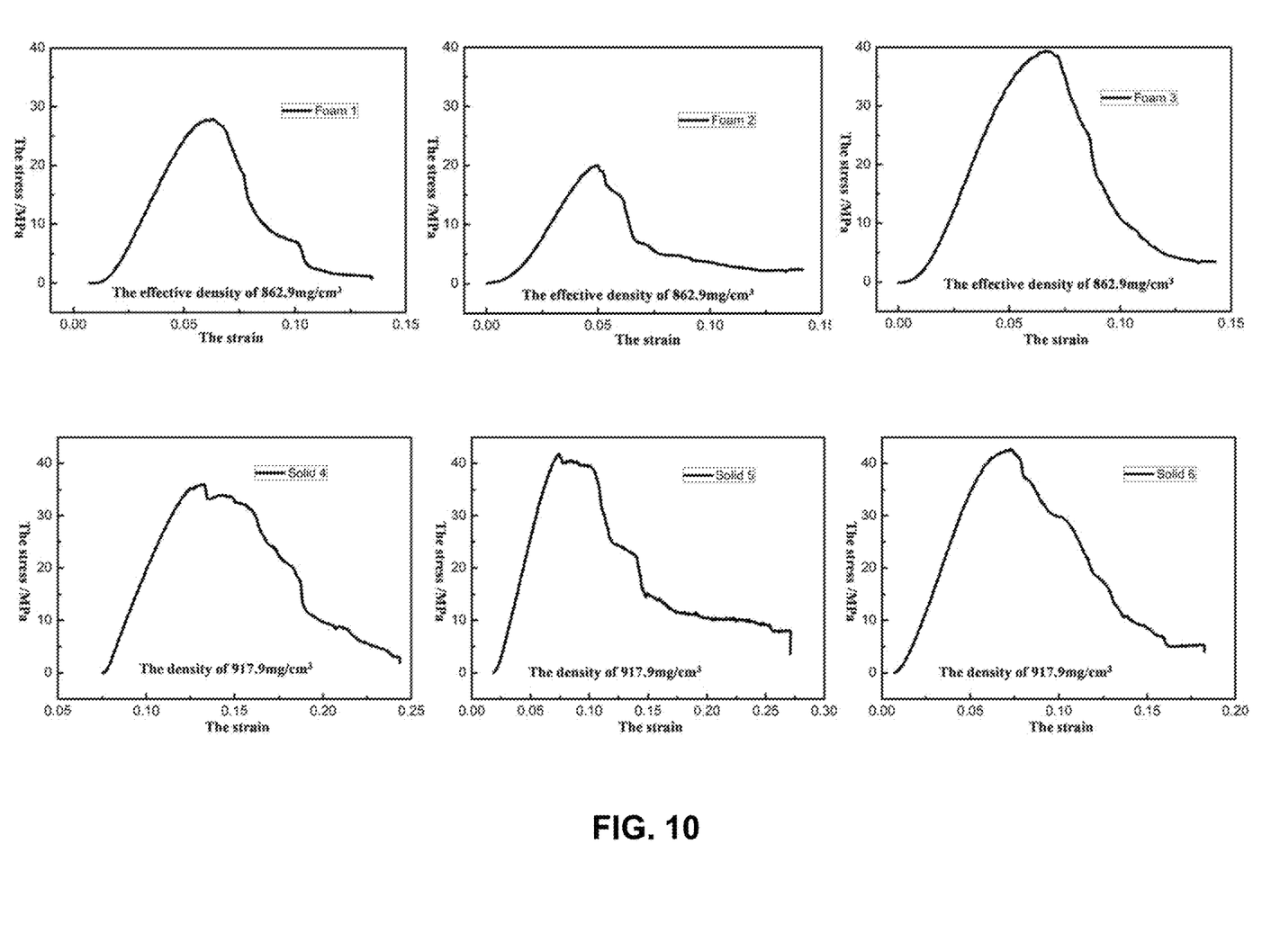
FIG. 10 show stress-strain curves of the uniaxial compression test for the fabricated regular foam polystyrene samples (top row) and the solid polystyrene samples (bottom row).

Results of Mechanical Testing: The results of the uniaxial compression tests of the regular foam samples as well as on the controls (that are solid samples) are presented in FIG. 10 and summarized in the Table 1 below.

TABLE 1

The compressive strength of testing for foam and solid materials

| Materials | Number | Effective density (mg/cm$^3$) | Compressive strength (MPa) | |
|---|---|---|---|---|
| Foam | 1 | 862.9 | 27.85 | 29.09 |
| | 2 | | 20.03 | |
| | 3 | | 39.38 | |
| Solid | 4 | 917.9 | 36.00 | 41.06 |
| | 5 | | 41.75 | |
| | 6 | | 42.73 | |

Figure 7B:
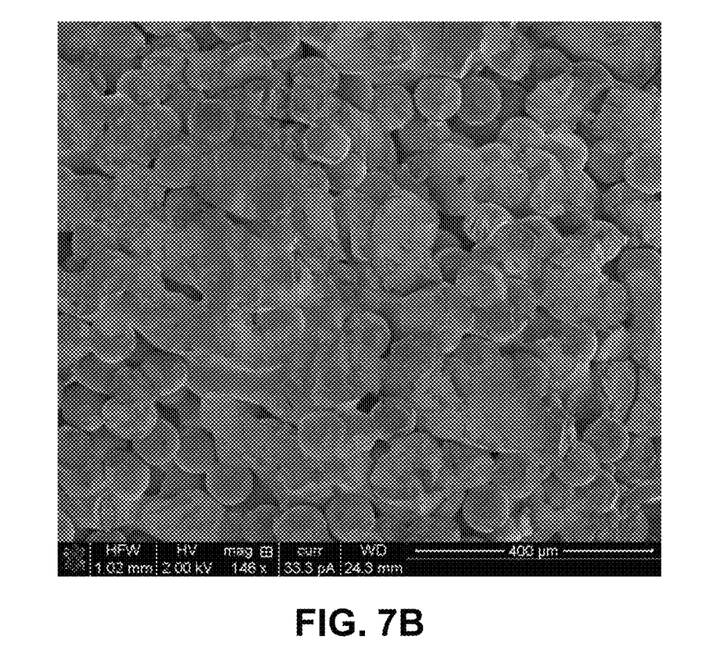
FIG. 7B shows a SEM image of a close-up of the fabricated substrate of the present invention representing the surface of the cavity.

Solid polystyrene samples have compressive strength in the range between 36.00 and 42.73 MPa, while less dense regular foam samples have compressive strength in the range between 27.85 and 39.38 MPa. FIG. 7B presents an SEM image of the polystyrene part (close up of the cavity of the foam sample). It is evident that the samples (both solid and the foams) have a highly granular structure. Table 3 summarizes Young's moduli of solid samples and fabricated regular foam samples.

TABLE 3

The Young's modulus values of foam samples and solid samples

| Source of data | Type of samples | Young's modulus/MPa | |
|---|---|---|---|
| testing | Solid | 779.2 | 844.2 |
| | | 874.5 | |
| | | 879.0 | |
| | Foam | 717.3 | 728.9 |
| | | 583.6 | |
| | | 885.9 | |

Figure 11:
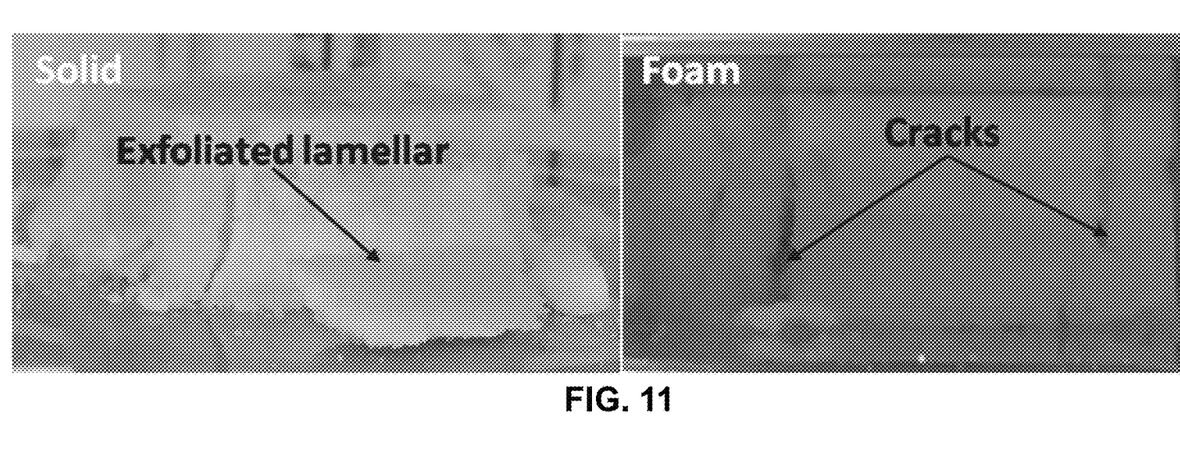
FIG. 11 shows the fracture propagation in the solid (left) and foam (right) samples under compression.
Figure 12:
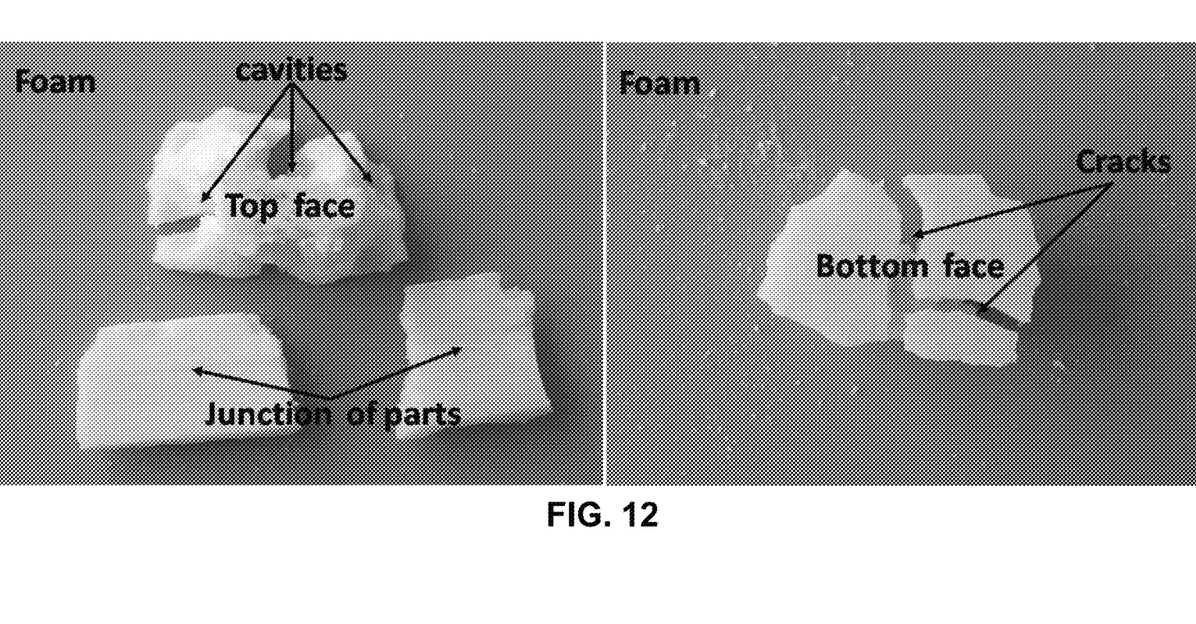
FIG. 12 shows the fracture morphology of a fabricated foam sample after the compression test.

Fracture morphologies, for both solid samples and fabricated foam samples, were similar, representing a top to bottom crack as seen in FIG. 11. Solid samples had relatively thin slivers flaking off from the sides of the samples under the applied critical stress, while the foam samples had larger pieces separated during the fracture with cracks passing through the fabricated pores as shown in FIG. 12. The joints formed between the first, second, and third parts of the fabricated foam samples did not disintegrate during testing and there was no delamination of parts of the foam samples during the mechanical testing.

The present invention has demonstrated a fabrication path to manufacture polystyrene regular foam utilizing multi-step process flow with selective laser sintering technology. Fabricated regular foam samples had lower effective density as compared to the solid polystyrene samples of the same dimensions also fabricated from the same polystyrene powder using SLS process. Mechanical testing results reveal it is possible to have the performance of the foam sample comparable to that of the solid part. For example, the strongest foam sample had Young's modulus 885.9 MPa compared to 879.0 for the solid sample, and the same foam sample had compressive strength of 39.38 MPa as compared to 42.73 MPa for the strongest solid sample. In some embodiments, the present invention may be extended to processes such as selective laser melting to fabricate metallic regular foams.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of fabricating a closed-cell, porous substrate (100) using an additive manufacturing process, the method comprising:
   a. depositing a layer of a first powder on a target surface and developing a selected portion of said layer according to the additive manufacturing process such that the powder binds together to form a solid layer, wherein the powder outside of the selected portion is unbound powder, and wherein the deposited layer forms a target surface for a subsequent layer;
   b. repeating step a, layer by layer, until a three-dimensional porous substrate comprising a plurality of partially closed cavities (110) is formed from the solid layers, wherein each cavity (110) comprises one or more channels (120), each channel having an opening (125) at an uppermost layer, wherein the channel openings (125) are on a same plane, and wherein the cavities (110) are filled with the unbound powder;

c. removing the unbound powder from the cavities (110) through the openings (125) of the channels; and d. depositing and developing one or more layers of a second powder over the channel openings (125) until the channel openings are closed, thereby forming the cavities into closed-cells (115), and the substrate into said closed-cell, porous substrate (100).

2. The method of claim 1, wherein the method further comprises repeating steps a-d to form a plurality of substrate layers (105) comprising a plurality of closed cells (115), wherein the target surface for each new substrate layer is the top of the previous substrate layer.

3. The method of claim 1, wherein the cavities (110) are at least partially or completely filled with a filler prior to closing the channel openings (125) to form filled closed-cells.

4. The method of claim 3, wherein the filler is a fluid, liquid, gas, metallic material, powder, plastic, or wax.

5. The method of claim 1, wherein the first powder and the second powder are the same.

6. The method of claim 1, wherein the first and second powders are comprised of particles, wherein the particles of the second powder are larger in diameter than those of the first powder.

7. The method of claim 1, wherein the size of the channels is selected to be large enough that the powder can be removed and also small enough that it can be sealed with subsequent layers of powder.

8. The method of claim 1, wherein the unbound powder is removed by vacuum, negative pressure, positive pressure, or by a solvent.

9. The method of claim 1, wherein a shape of the cavities is a sphere, ellipsoid, cylinder, cube, tetrahedron, or cone.

10. The method of claim 1, wherein a diameter of the cavities is about 1-20 mm.

11. The method of claim 1, wherein a diameter of the channels is about 0.1-3 mm.

12. The method of claim 1, wherein the first or second powder comprises a polymer, ceramic, glass or metal powder.

13. The method of claim 12, wherein the polymer comprises polystyrene, polyamide, polyethylene, polypropylene, polyacrylonitrile-butadiene-styrene (ABS), polyvinyl chloride (PVC) or polycarbonate.

14. The method of claim 1, wherein the additive manufacturing process comprises selective laser sintering, selected laser melting, direct metal laser sintering, electron-beam melting, or binder jetting.

15. The method of claim 1, wherein the substrate has a density that is lower than that of an analogous solid substrate.

16. The method of claim 1, wherein the substrate is configured for use in energy absorption, vibration control, electrical handling, fire retardance, buoyancy, thermal insulation, or the production of lightweight and stiff structures.

* * * * *